United States Patent
Yamamoto

(10) Patent No.: US 7,610,388 B2
(45) Date of Patent: Oct. 27, 2009

(54) SYSTEM, METHOD AND PROGRAM FOR COORDINATING TIMEOUTS FOR DISTRIBUTED SERVERS

(75) Inventor: Hiroshi Yamamoto, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 10/805,428

(22) Filed: Mar. 18, 2004

(65) Prior Publication Data

US 2004/0249921 A1 Dec. 9, 2004

(30) Foreign Application Priority Data

Apr. 3, 2003 (JP) ............................. 2003-100749

(51) Int. Cl.
 *G06F 15/16* (2006.01)
(52) U.S. Cl. ..................................... 709/227; 709/246
(58) Field of Classification Search ................. 709/203, 709/226–229, 246; 379/221.01, 229
See application file for complete search history.

(56) References Cited

U.S. PATENT DOCUMENTS

| | | | | |
|---|---|---|---|---|
| 5,762,552 | A * | 6/1998 | Vuong et al. ................... 463/25 |
| 6,415,027 | B1 * | 7/2002 | Malik ..................... 379/221.01 |
| 6,836,805 | B1 * | 12/2004 | Cook .......................... 709/245 |
| 6,909,708 | B1 * | 6/2005 | Krishnaswamy et al. .... 370/352 |
| 7,181,492 | B2 * | 2/2007 | Wen et al. .................... 709/204 |
| 7,317,787 | B2 * | 1/2008 | Crockett et al. .......... 379/88.03 |
| 2003/0088677 | A1 * | 5/2003 | Yamamoto .................. 709/227 |
| 2003/0140121 | A1 * | 7/2003 | Adams ........................ 709/219 |
| 2004/0019687 | A1 * | 1/2004 | Ozawa et al. ................ 709/229 |
| 2005/0246445 | A1 * | 11/2005 | Panasyuk et al. ............ 709/227 |

FOREIGN PATENT DOCUMENTS

| | | |
|---|---|---|
| JP | PUPA 11-167551 | 6/1999 |
| JP | PUPA 2002-158707 | 5/2002 |
| JP | PUPA 2002-189646 | 7/2002 |
| JP | PUPA 2003-141074 | 5/2003 |
| JP | PUPA 2004-062402 | 2/2004 |

OTHER PUBLICATIONS

"Building a Secure Web System-Basic Design of Session", Nikkei Byte, Aug. 2002, No. 231, pp. 124-129.

* cited by examiner

*Primary Examiner*—Frantz B Jean
(74) *Attorney, Agent, or Firm*—Arthur Samodovitz; Greenblum & Bernstein P.L.C.

(57) ABSTRACT

System, method and program product for determining timeouts for sessions between first and second servers and between first and third servers. The first server receives a client request for a first service. The first service requires a second service from the second server and a third service from the third server. A first timeout is determined for a first session between the first server and the second server to obtain the second service. A second timeout is determined for a second session between the first server and the third server to obtain the third service. The first and second time-outs are based in part on an order in which the second and third servers begin their respective services. The second server begins the second service before the third server begins the third service. The first timeout is based on a time required for the second server to provide the second service and the third server to provide said third service. The second timeout is based on a time required for the third server to provide the third service.

19 Claims, 8 Drawing Sheets

[Figure 1]
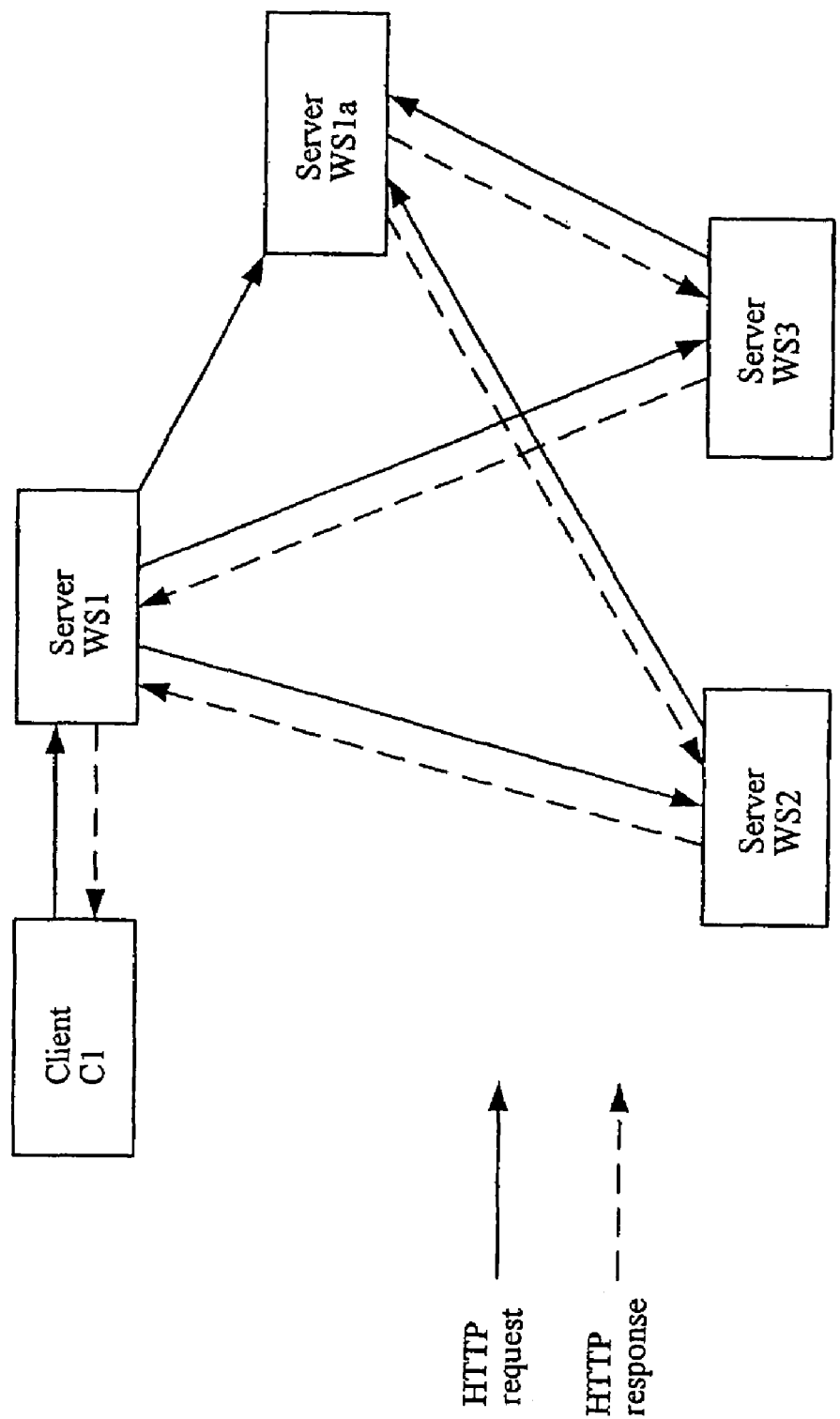

[Figure 2]
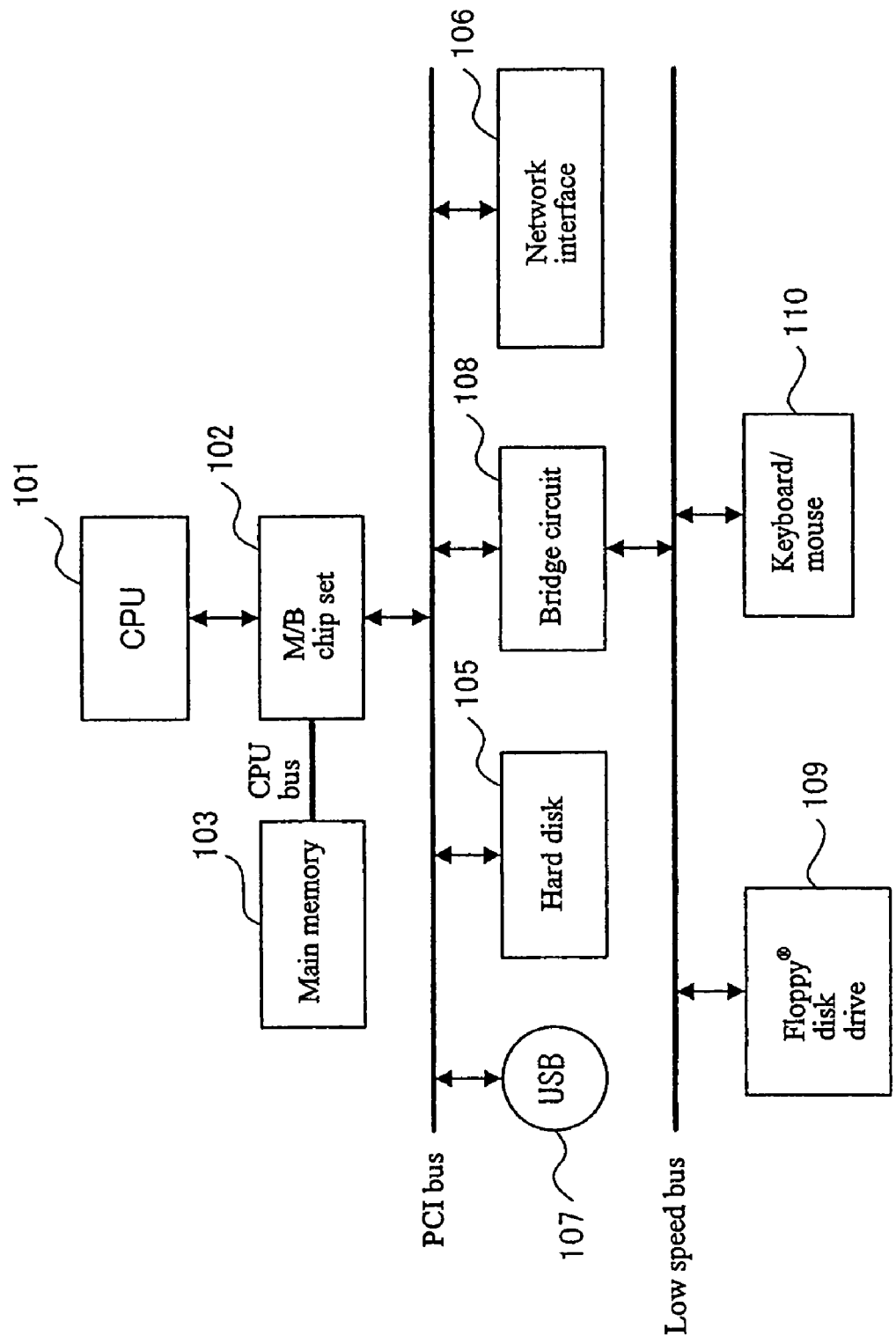

[Figure 3]
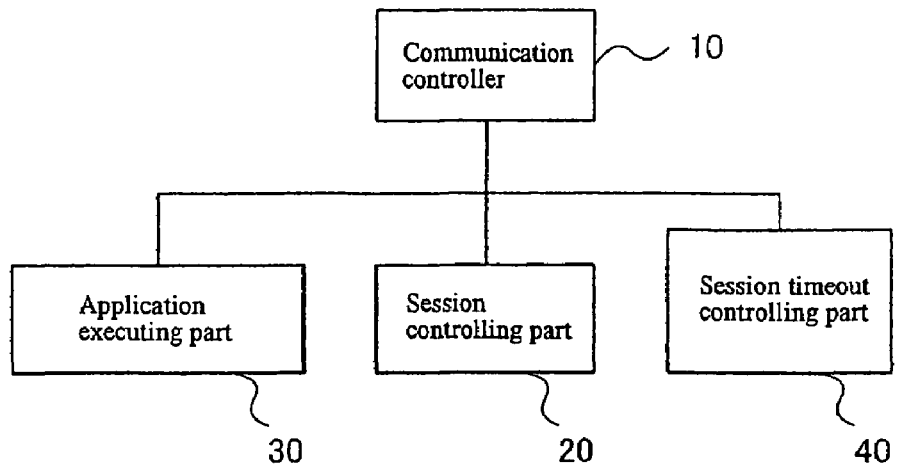
[Figure 4]
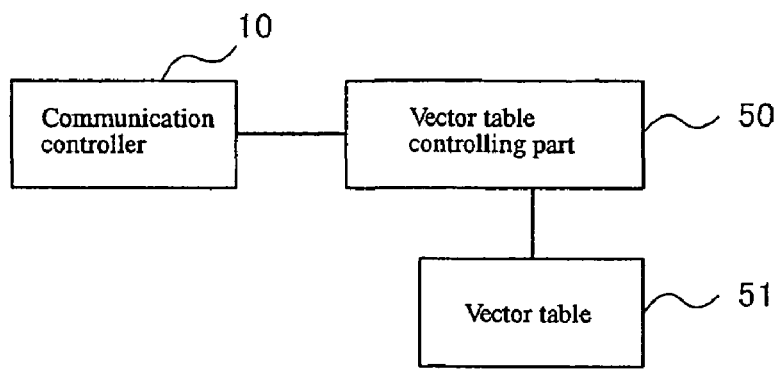
[Figure 5]
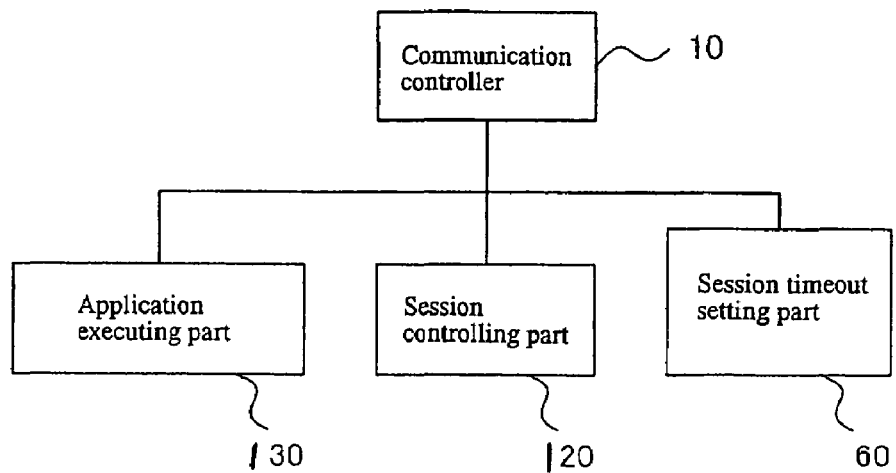

[Figure 6]
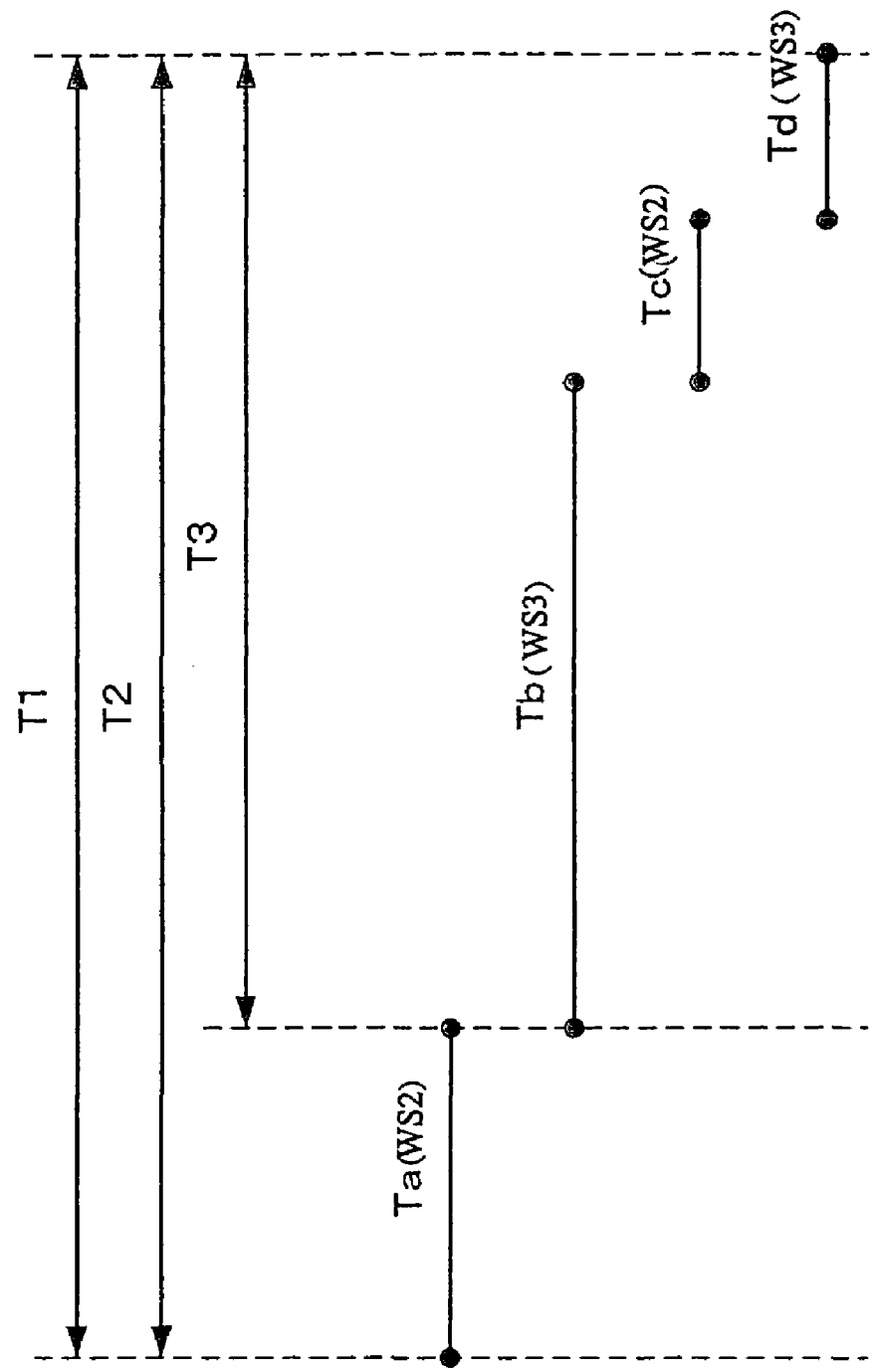

[Figure 7]
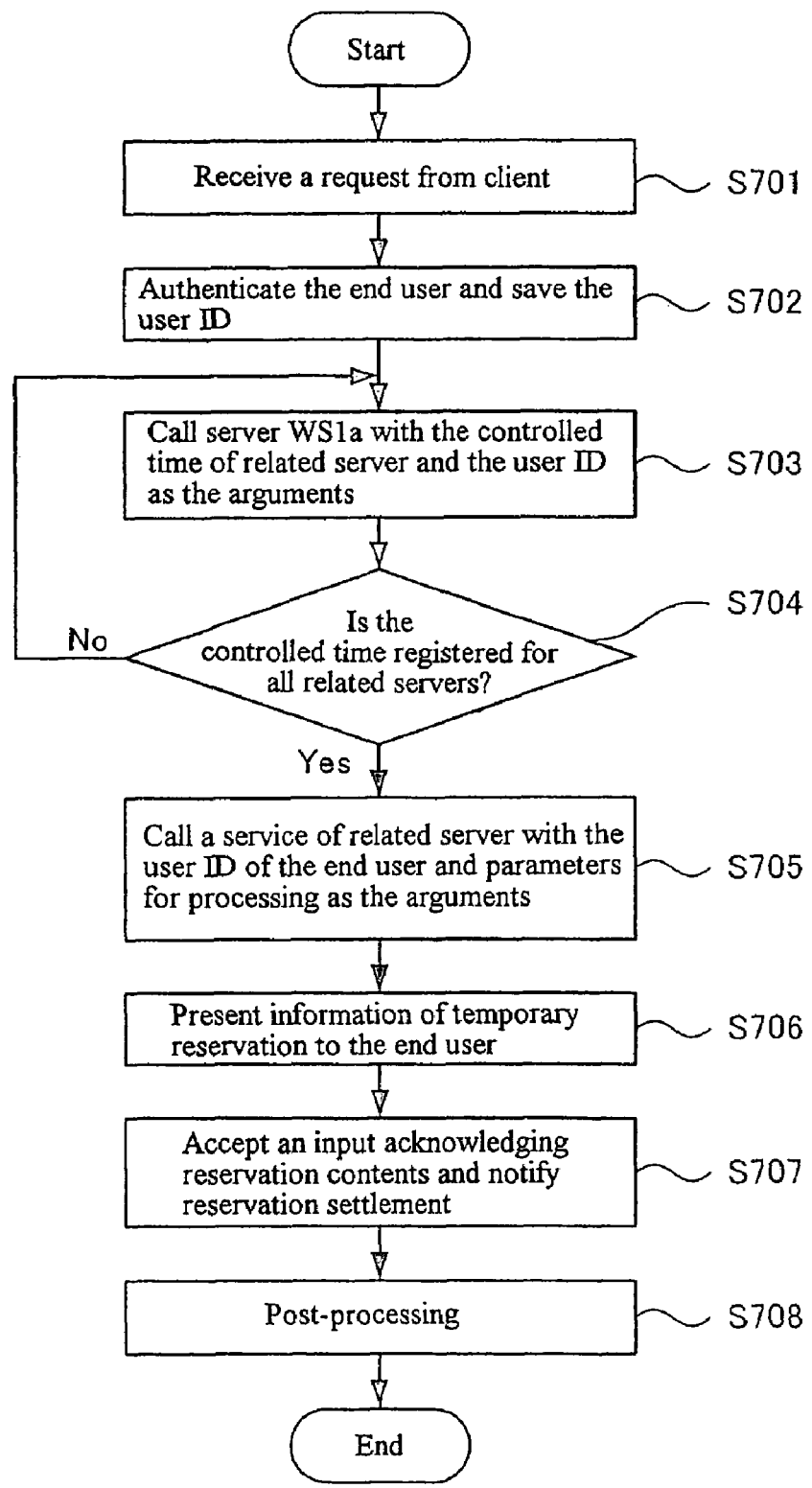

[Figure 8]
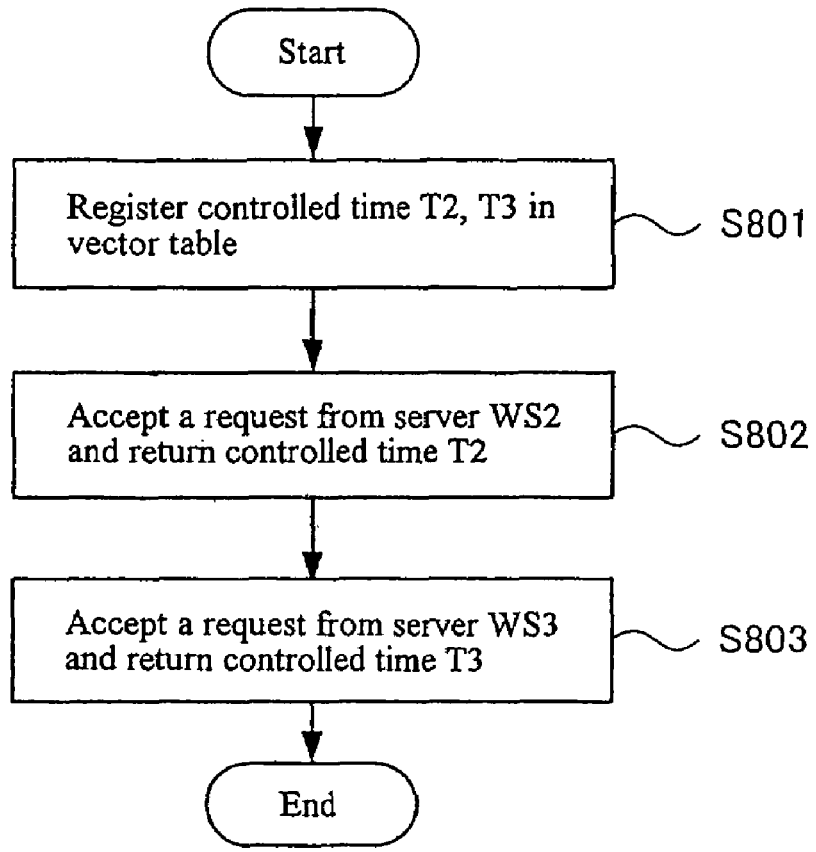
[Figure 9]
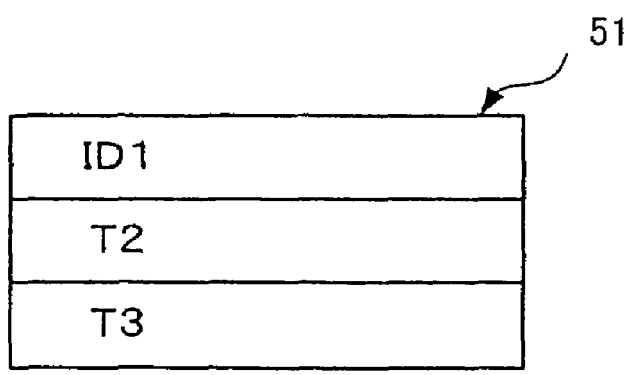

[Figure 10]
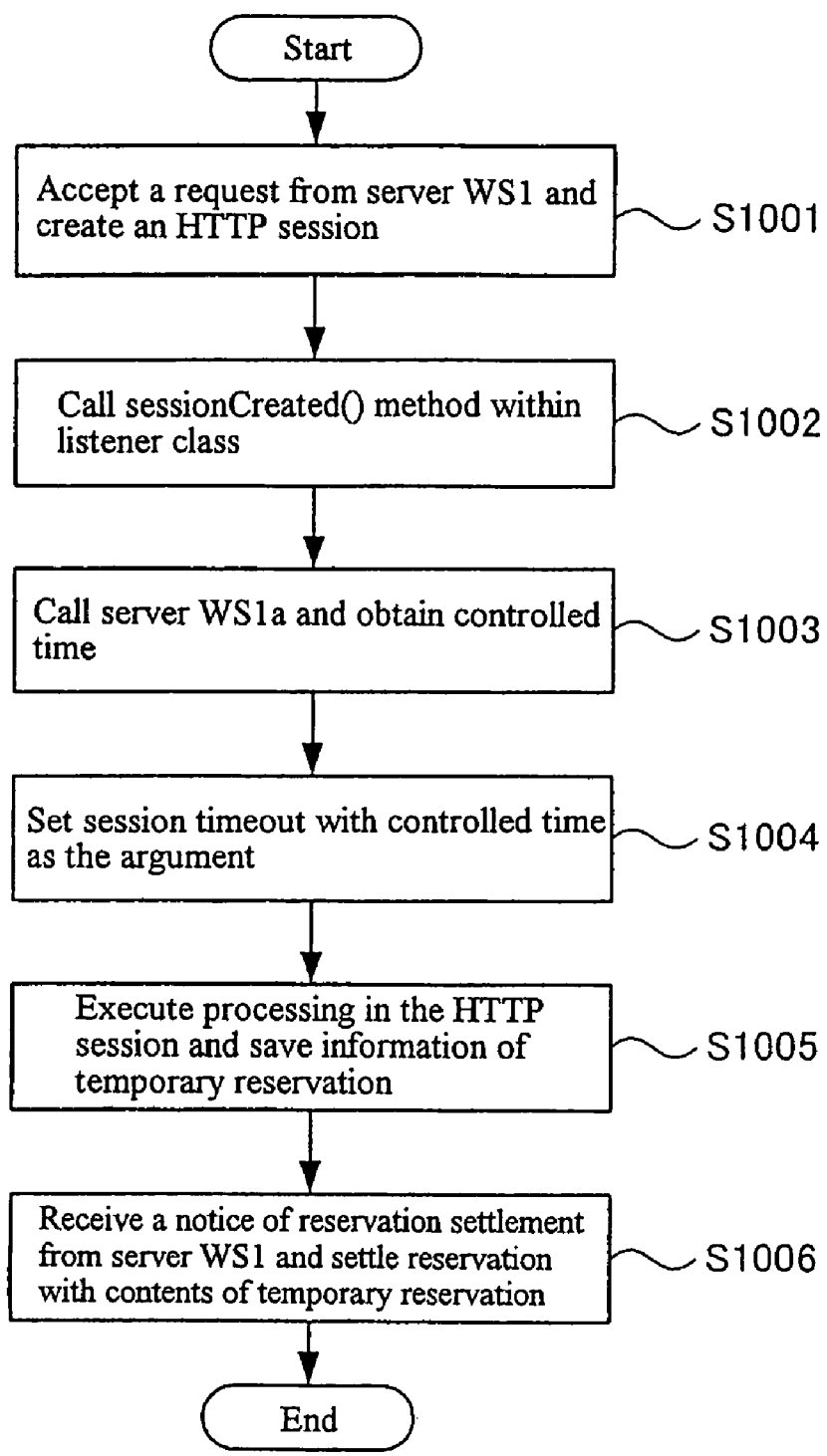

[Figure 11]
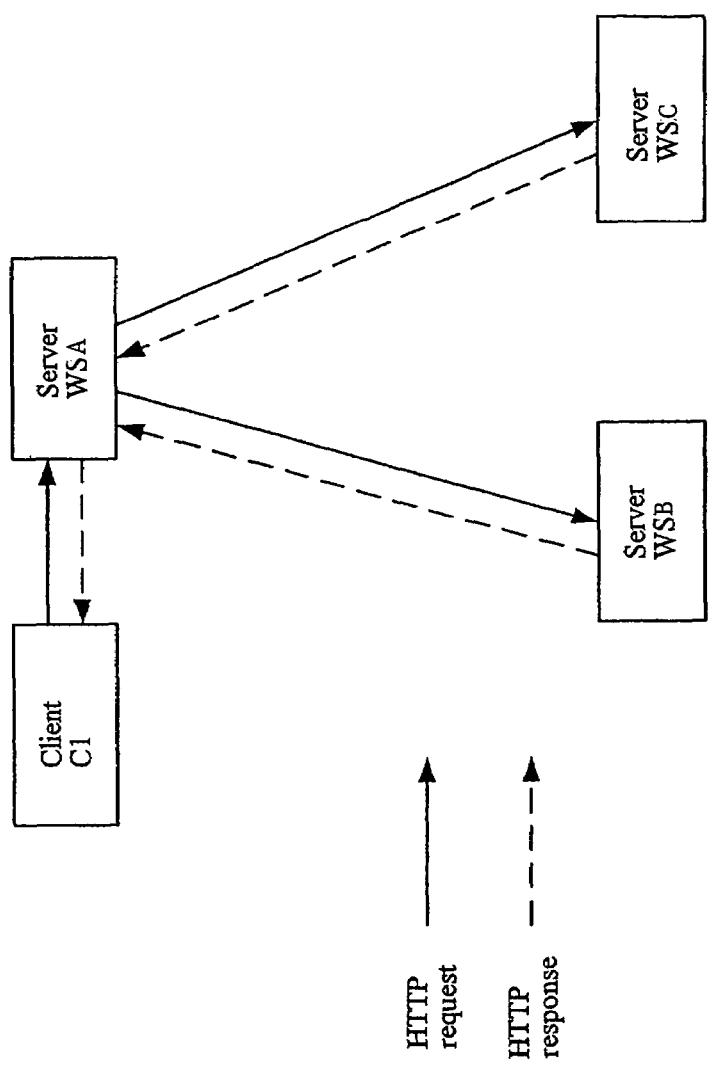
PRIOR ART

SYSTEM, METHOD AND PROGRAM FOR COORDINATING TIMEOUTS FOR DISTRIBUTED SERVERS

BACKGROUND

The present invention relates generally to computer systems, and deals more particularly with coordinating time-outs for distributed servers.

A wide variety of computer services are available today via the Internet. In some cases, a single user request requires services (such as information) from more than one server. Some Web services allow different servers on the Internet to cooperate with each other to collectively provide the service required by a client of one server. One computer application can call application functions (or services) from one or more other computers. FIG. 11 illustrates a prior art environment where a user/client makes a request to a Web server labeled WSA. To respond to the request, Web server WSA needs services (such as information) from other Web servers labeled WSB and WSC. So, Web server WSA establishes HTTP sessions with Web servers WSB and WSC, i.e. WSA-WSB and WSA-WSC. For example, web server WSA provides a managing Web service and point of control point for travel reservation, web server WSB provides a Web service for an airplane reservation, and web server WSC provides a Web service for a rent-a-car reservation. In this example, the end user initiates an HTTP session with WSA and issues to WSA a request for travel reservations, including an airplane reservation and a rent-a-car reservation. In response, WSA establishes HTTP sessions with WSB and WSC. Then, WSA makes a request for the airplane reservation to WSB, and makes a request for the rent-a-car reservation to WSC.

It was known for a Web server to set up a session timeout to terminate a session and related processing after lapse of a fixed time from the start of the service. See Japan Published Unexamined Patent Application No. 11-161507, pages 5 and 6. In this PUPA, a Web server at a control point calls other Web servers to provide respective web services. The HTTP sessions between the control point server and the called servers exist independently, although they are associated with each other by the control point server. The length of the timeout for each HTTP session depends on the server providing the Web service. While one Web service is operating within its HTTP session, the HTTP session of another, related Web service may timeout. This is illustrated by the following example. The control point server WSA requests an airplane reservation from called server WSB, and a rent-a-car reservation from called server WSC. Generally, neither reservation is finalized until the control point server WSA presents both to the customer for approval. So, WSA makes a temporary airplane reservation with WSB pursuant to an airplane reservation proposed by WSB, and stores the airplane reservation information in association with the HTTP session with WSB. In some cases, the HTTP session for WSB times-out before WSC completes its processing and returns a temporary rent-a-car reservation to WSA in association with the session for WSC. In such a case, processing at WSB ends before WSC makes the temporary rent-a-car reservation, and the temporary airplane reservation made at WSB is invalid. In such a case, WSA needs to prompt the customer to input the airplane reservation parameters again and await processing by WSB, and this frustrates the customer.

Accordingly, an object of the present invention is to coordinate distributed servers involved in related work, so the servers will not time-out needlessly.

SUMMARY

The invention resides in a system, method and program product for determining time-outs for sessions between first and second servers and between first and third servers. The first server receives a client request for a first service. The first service requires a second service from the second server and a third service from the third server. A first timeout is determined for a first session between the first server and the second server to obtain the second service. A second timeout is determined for a second session between the first server and the third server to obtain the third service. The first and second time-outs are based in part on an order in which the second and third servers begin their respective services.

According to a feature of the present invention, the first server determines the first timeout for the first session between the first server and the second server, and the first server determines the second timeout for the second session between the first server and the third server.

According to another feature of the present invention, the second server begins the second service before the third server begins the third service. The first timeout is based on a time required for the second server to provide the second service and the third server to provide said third service. The second timeout is based on a time required for the third server to provide the third service.

According to another feature of the present invention, the second service comprises a first sub service and a second sub service, and the third service comprises a third sub service and a fourth sub service. The sub services are performed in an order of the first sub service, the third sub service, the second sub service and the fourth sub service. The first timeout is based on a time for the first, third, second and fourth sub services. The second timeout is based on a time for the third, second and fourth sub services. The second timeout is shorter than the first timeout.

According to another feature of the present invention, the first server creates a session with the client and creates a third timeout for the session with the client. Ending times for the first and second time-outs are based on an ending time for the third timeout.

BRIEF DESCRIPTION OF THE FIGURES

FIG. 1 is a block diagram showing a distributed computer system with an HTTP session control according to an embodiment of the present invention.

FIG. 2 is a block diagram showing an example of hardware and software components within each of the servers of FIG. 1.

FIG. 3 is a block diagram showing program components within a server WS1 of FIG. 1.

FIG. 4 is a block diagram showing program components within a server WS1a of FIG. 1.

FIG. 5 is a block diagram showing program components within servers WS2 and WS3 of FIG. 1.

FIG. 6 is a timing diagram of processing by servers WS2 and WS3 of FIG. 1 when called by server WS1 of FIG. 1.

FIG. 7 is a flowchart illustrating operation of the server WS1 of FIG. 1.

FIG. 8 is a flowchart illustrating operation of the server WS1a of FIG. 1.

FIG. 9 is a diagram showing an example of a vector table used by the server WS1a of FIG. 1.

FIG. 10 is a flowchart illustrating operation of the servers WS2 and WS3 of FIG. 1.

FIG. 11 is a block diagram of a distributed computer system according to the prior art.

DETAILED DESCRIPTION OF THE PREFERRED EMBODIMENTS

The preferred embodiments of the present invention will now be described in detail with reference to the accompanying figures. FIG. 1 illustrates overall configuration of a network system having an HTTP session control according to an embodiment of the present invention. Servers WS1, WS2 and WS3 provide Web services to a client computer C1 (on behalf of an end user) and are connected via a network such as the Internet. Server WS1a is also connected to the servers WS1, WS2 and WS3 via the Internet for session coordination purposes as described below. The client C1 can be a network terminal employed by the end user. Using a Web browser on the client computer, the client computer gains access to server WS1 to make a request for a Web service provided or managed by the server WS1. When the client C1 makes the request to the server WS1 for the Web service, the server WS1 creates an HTTP session with the client. To fully respond to the client request, server WS1 calls Web servers WS2 and WS3 requesting respective services (such as information). To make and respond to these requests, web servers WS1 and WS2 establish an HTTP session with each other, and web servers WS1 and WS3 establish an HTTP session with each other. In these sessions, web server WS1 is a requester to web server WS2 and a requestor to web server WS3. Web servers WS2 and WS3 are responders.

In accordance with the present invention, prior to calling the servers WS2 and WS3 for their respective Web services, the server WS1 calls a Web service in server WS1a (shown in FIG. 4) to register an overall set value of session timeout for responding to the client request by all involved servers. The "set value" (also called "controlled time") is the duration of the timeout and corresponds to an end time of the timeout. After receiving their respective requests from server WS1 and before responding to these requests (related to the client request), the servers WS2 and WS3 both access the server WS1a to obtain the controlled time. With this controlled time, servers WS2 and WS3 set their own session timeout to end when the controlled time will end. The details of these operations and the functions of each server WS1, WS1a, WS2 and WS3 are described below.

FIG. 2 illustrates an example of standard hardware and software components within each of the servers WS1, WS1a, WS2 and WS3 and the client computer C1. A CPU (Central Processing Unit) 101 and a main memory 103 are connected via an M/B (Mother Board) chip set 102 and a CPU bus. A hard disk 105, network interface 106 and USB port 107 are connected via a PCI (Peripheral Component Interconnect) bus to the M/B chip set 102. A floppy disk drive 109 and a keyboard/mouse 110 are connected via a PCI bus, a bridge circuit 108 and a low speed bus such as an ISA (Industry Standard Architecture) bus to the M/B chip set 102.

FIG. 3 illustrates a functional configuration of the server WS1 according to an embodiment of the present invention. A communication controller 10 transmits and receives information via the network to or from the client C1 and to or from the servers WS1a, WS2 and WS3. A session controlling part 20 controls the HTTP sessions involving the server WS1. An application executing part 30 performs the Web service of server WS1. A session timeout controlling part 40 registers the controlled time in the server WS1a. In the illustrated embodiments, session controlling part 20, application executing part 30 and session timeout controlling part 40 are implemented by computer programs received by a computer readable storage medium or the Internet, stored on hard disk 105 and executed on CPU 101. In the illustrated embodiment, communication controller 10 is also implemented by a computer program received by a computer readable storage medium or the Internet, stored on hard disk 105 and executed on CPU 101. Communication controller 10 interacts with network interface 106. By way of example, these programs may comprise Java® (trademark by Sun Microsystems Inc.) servlets.

The communication controller 10 manages communication with the client C1 and the servers WS2 and WS3 via the Internet. When the communication controller 10 receives a request from the client C1, the session controlling part 20 establishes an HTTP session with the client, and initiates a timer with a set value for the session with the client. The session controlling part 20 determines the set value based on, for example, any of the following. The developer of the services program in servers WS1, WS2 and WS3 can specify and record in a configuration file the set value based on his or her knowledge of the time normally required for the servers WS1, WS2 and WS3 to perform their respective services, including the processing time in servers WS1, WS2 and WS3 and a nominal, communication transit time. Alternately, the systems administrator can specify the set value based on his or her experience and knowledge of the time normally required for servers WS1, WS2 and WS3 to perform their respective services, and an estimated communication transit time in the actual network. Alternately, the set value can be determined through experience of server WS1. WS1 maintains a communication log indicating when responses were received from servers WS2 and WS3 for past requests, and if time-outs occurred between the client and server WS1. Server WS1 can start with a default set value for related/complementary types of services provided by servers WS2 and WS3 (such as airplane reservations by server WS2 and rent-a-car services by server WS3). If frequent time-outs occur in WS1 before servers WS2 and WS3 complete their respective services and respond to WS1, then WS1 can lengthen the set time. Conversely, if servers WS2 and WS3 usually complete their respective processing and report their results to server WS1 well before the expiration of the set time, then WS1 can shorten the set time. If the timer reaches the set time/value, the session controlling part 20 terminates the HTTP session with the client C1.

The application executing part 30 performs the Web service of server WS1 in the HTTP session under the control of the session controlling part 20. The nature of the client request or the Web service provided by server WS1 are not important to the present invention, except that the server WS1 sends requests to the servers WS2 and WS3 (for additional services) in order to fully respond to the client request. Prior to making the requests to the servers WS2 and WS3, the session timeout controlling part 40 of server WS1 transmits a request to the server WS1a to register the controlled time. The session timeout controlling part 40 determines the magnitude of the set value/controlled time as detailed below. Application executing part 30 then calls servers WS2 and WS3 to obtain services such as airline or rent-a-car reservations or information needed for the client request.

FIG. 4 illustrates a functional configuration of the server WS1a according to one embodiment of the present invention. A communication controller 10 transmits and receives information via the network to and from servers WS1, WS2 and WS3. A vector table controlling part 50 and a vector table 51 accept and store the controlled time received from the server WS1. The communication controller 10 in server WS1a is similar to the communication controller 10 in server WS1. The vector table controlling part 50 can be a computer program such as a Java® (trademark by Sun Microsystems Inc.) servlet, received from a computer readable medium or the Internet, stored in hard disk 105 and executed on a CPU 101 within server WS1a. The vector table 51 has a data structure (array) in main memory which stores the controlled time for the HTTP session with server WS1. As described below, servers WS2 and WS3 obtain the controlled time from server WS1 and determining their own time-outs accordingly for their own processing (to end when the controlled time specified by server WS1 ends). The vector table controlling part 50 of server WS1a communicates with the server WS1 via the communication controllers of each server. The vector controlling part 50 generates an HTTP session with server WS1 in response to the request from server WS1, and creates the vector table 51 for the HTTP session. Server WS1a records ID information for this session with WS1 identifying the vector table 51 and the controlled time specified by server WS1. The servers WS2 and WS3 later use the ID information to obtain the controlled time specified by server WS1. When each of the servers WS2 and WS3 receives a request from server WS1 relating to the same client request, each of the servers WS2 and WS3 requests the controlled time from server WS1a. To calculate the timeout for server WS2, server WS1a calculates the time remaining in the overall controlled time specified by server WS1. Likewise, to calculate the timeout for server WS3, server WS1a calculates the time remaining in the overall controlled time specified by server WS1. Thus, the order in which the servers WS2 and WS3 request the controlled time from server WS1 (and begin processing) affect the respective time-outs in those servers. (The later starting server will have less time to complete its processing within the overall controlled time specified by server WS1.) The ID information may be specified in the server WS1 and passed to the server WS1a when server WS1 calls the server WS1a, or specified in the server WS1a when the vector table 51 is created and passed to the server WS1. (In FIG. 1 the server WS1a is illustrated as separate from server WS1, but alternately its function may instead be incorporated into the server WS1.)

FIG. 5 illustrates a functional configuration of the servers WS2 and WS3 according to one embodiment of the present invention. Each of servers WS2 and WS3 comprises a communication controller 10 for transmitting and receiving information via the network to and from the servers WS1 and WS1a. Each of servers WS2 and WS3 also comprises a session controlling part 120 for controlling the HTTP session for the Web services provided by the servers WS2 and WS3, respectively. Each of servers WS2 and WS3 also comprises an application executing part 130 for performing the respective Web service, and a session timeout setting part 60 for obtaining the controlled time (registered value) of the HTTP session from the server WS1a and setting its own session timeout based on the obtained controlled time. The communication controller 10 is the same as in server WS1. In the illustrated embodiment, the session timeout setting part 60 is a computer program, such as a Java® (trademark by Sun Microsystems Inc.) servlet, stored in hard disk 105 and executed in the CPU 101 in the server. The session timeout setting part 60 program can be delivered to servers WS2 and WS3 on a computer readable medium or via the Internet. The session timeout setting part 60 within servers WS2 and WS3 calls the server WS1a after receiving their respective requests from server WS1 but prior to starting the processing of their application executing part 30. The session controlling part 120 of server WS2 obtains from the session controlling part 20 of WS1a the set value/controlled times (T2) for server WS2 in its session with server WS1. The session controlling part 20 of server WS1a provides the T2 session timeout based on the controlled time obtained from server WS1 and the timing and order information in vector table 51. The session controlling part 120 of server WS3 obtains from the session controlling part 20 of WS1a the set value/controlled times (T3) for server WS3 in its session with server WS1. The session controlling part 20 of server WS1a provides the T3 session timeout based on the controlled time obtained from server WS1, and the timing and order information in vector table 51.

The following describes the technique for determining the set value/controlled time for the respective sessions with servers WS2 and WS3. FIG. 6 is a timing diagram of Web service processing by the servers WS2 and WS3 called by the server WS1. Assume that the times taken for processing by WS2, WS3, WS2 and WS3 in this order are Ta, Tb, Tc and Td, respectively. In order that the session timeout does not occur in server WS2 during processing by server WS3, the set value T2 of session timeout in the server WS2 is greater than or equal to Ta+Tb+Tc+Td. In order that the session timeout does not occur in server WS3 during processing by server WS2, the set value T3 of session timeout in the server WS3 is greater than Tb+Tc. However, server WS3 needs an addition time Td to complete its own processing so the set value T3 is greater than or equal to Tb+Tc+Td. Because the set value T1 of session timeout for the session with the client for processing by server WS1 must last for all the processing by servers WS2 and WS3, the set value T1 of session timeout must be greater than T2 and T3, and greater than or equal to Ta+Tb+Tc+Td. Consider an example where server WS1 provides overall management of travel reservations, server WS2 provides airplane reservations and server WS3 provides rent-a-car reservations. The time Ta reflects time of first processing in the server WS2 when server WS2 provides a first service, for example, airplane reservation. Ta also reflects communication propagation time between servers WS1 and WS2. The time Tb reflects time of first processing in the server WS3 when server WS3 provides a second service, for example, rent-a-car reservation. Tb also reflects communication propagation time between servers WS1 and WS3. The time Tc reflects time of second processing in the server WS2 when server WS2 tries again to provide the first service (airplane reservation). The time Tc also reflects communication propagation time between servers WS1 and WS2. The time Td reflects time of second processing in the server WS3 when server WS3 tries again to provide the second service (rent-a-car reservation). Td also reflects communication propagation time between servers WS1 and WS3. In the foregoing example where server WS1 provides a travel-planning service, server WS2 provides an airplane reservation service, and server WS3 provides a rent-a-car reservation service, the rent-a-car reservation processing starts after the airplane reservation is (at least tentatively) fixed. This is because the arrival time of the airplane is required for rent-a-car reservation. That is the reason why Ta preceeds Tb and Tc preceeds Td in the example illustrated in FIG. 6. So, after server WS2 performs its temporary airplane reservation service, server WS2 reports back the results to server WS1. Subsequently server WS1 requests the rent-a-car service from server WS3. Server WS1 can estimate the processing and communication propagation times, Ta and Tc, between servers WS1 and WS2 for each of the first and second services from server WS2 based on default values. The default values can be set by the web services program developers based on nominal times for processing in server WS2 and communication propagation through the network. The default values can also be set by the systems administrator through experience with the services in WS2 and communication propagation through the network or direct knowledge of the architecture and load of the network. Server WS1 can also estimate the processing and communication propagation times Ta and Tc based on past experience/ analysis of the communication log in the WS1. The communication log logs the time of each of the first and second service requests from server WS1 to server WS2 and the time of the first and second service responses from server WS2. Likewise, server WS1 can estimate the processing and communication propagation times, Tb and Td, between servers WS1 and WS3 for each of the first and second services from server WS3 based on default values. The default values can be set by the web services program developers based on nominal times for processing in server WS3 and communication propagation through the network. The default values can also be set by the systems administrator through experience with the services in WS3 and communication propagation through the network or direct knowledge of the architecture and load of the network. Server WS1 can also estimate the processing and communication propagation times Tb and Td based on past experience/analysis of the communication log in the WS1. The communication log logs the time of each of the first and second service requests from server WS1 to server WS3 and the time of the first and second service responses from server WS3.

In this manner, the controlled time of session timeout can be set for each server WS2 and WS3 (or others providing the Web service). Consequently, the HTTP session in each called server is usually prevented from ending before processing is completed in the other called servers and the calling server. In some cases, the set values/controlled times within the called servers as determined in the present invention are longer than their default values, and this extra time may be necessary to complete processing. Other times, the set values/controlled times as determined in the present invention may be considerably shorter than the default times, and this is appropriate to avoid waste of time when one of the called server is unable to complete its processing.

Even though FIG. 1 illustrates only two called servers, there can be more if needed. Each would include the components of servers WS2 and WS3 shown in FIG. 5. Also, the called servers WS2 and WS3 can call other servers to obtain other services needed for server WS1 to respond to the original client request. In such a case, these other servers include the corresponding components of servers WS2 and WS3 shown in FIG. 5, and calling servers WS2 and WS3 include the corresponding components of WS1 shown in FIG. 3 and act as the control point for these other servers.

Moreover, the server WS1a can control multiple groups of related Web services with the server WS1 or other servers as the control point. In such a case, each group of related Web services is identified by respective ID information registered in the vector table 51. That is, the server WS1a controls each group of Web services by managing a respective vector table 51.

The following is an example of the HTTP session control where each function of the servers WS1, WS1a, WS2 and WS3 is comprised of a Java® servlet. The servlet of the server WS1a includes a service method (setGlobalSessionTime/get-GlobalSessionTime) for implementing the function of the vector table controlling part 50 as described above. Thereby, the controlled time for the predetermined HTTP session can be set, or the set value can be referred to externally. A setGlobalSessionTime( ) method holds the controlled time in the internal table (vector table 51) of server WS1a in the called order. Also, a getGlobalSessionTime( ) method returns the value (registered value of controlled time) held in the internal table (vector table 51) in the called order with the registration ID as the argument. The servlet of the server WS1 determines the controlled time T2 of server WS2 and the controlled time T3 of server WS3 in accordance with the service performed by servers WS2 and WS3 and the communication propagation times. The servlet of the server WS1 calls the setGlobalSessionTime( ) method of server WS1a. In response, the vector table controlling part 50 registers the controlled time T2, T3 in the internal table (vector table 51) of server WS1a. Also, the application executing part 30 service method of server WS1 successively calls the service methods of servers WS2, WS3 as the related servers.

The servlet (RpcRouterServlet) of the server WS2 has a "listener class". Also, the servlet (RpcRouterServlet) of the server WS3 has a "listener class". That is, when the server WS1 calls the servers WS2 and WS3 for the first time, an HTTP session (object) is created by the method for implementing the function of the session controlling part 20. At this time, a method (sessionCreated( )) within the listener class (sessionTimeSetListener) implementing as subclass as Http Session Listner class is called only once when creating the HTTP session. Using this sessionCreated( ) method, the server WS2 or WS3 calls the getGlobalSessionTime of server WS1a. Server WS1a passes the controlled time T2, T3 specified in the session timeout controlling part 40 of server WS1 to the corresponding server WS2, WS3, and set as the set value of session timeout for each HTTP session. By adding the add-on listener class of HTTP session, the function is implemented only by adding the definition in a deployment descriptor (web.xml) of Web module, whereby the session timeout can be set without changing the program itself in the existing Web service for the servers WS2 and WS3.

Consider an example where the server WS1 provides a Web service of managing travel reservations, the server WS2 provides a Web service of airplane reservations, and the server WS3 provides a Web service of rent-a-car reservations. In this example, FIG. 7 illustrates the operation of server WS1, FIG. 8 illustrates the operation of server WS1a, and FIG. 10 illustrates the operation of servers WS2 and WS3. The client C (on behalf of the end user) makes a request for travel reservations (step 701). In response, server WS1 authenticates the end user and saves the user ID in main memory 103 (step 702). This request includes the parameters necessary for travel reservation (as well as parameters for airplane reservation and parameters for rent-a-car reservation). Next, the server WS1 calls the setGlobalSessionTime( ) method of server WS1a supplying the controlled time T2 of server WS2 and the user ID as the arguments (step 703). Thereby, the vector table controlling part 50 of server WS1a registers the controlled time T2 in the vector table 51 of server WS1a. At this point of time, the counter value of an index counter in the vector table 51 is equal to one to indicate the next extry point in the vector table. Moreover, the server WS1 calls the setGlobalSessionTime( ) method of server WS1a with the controlled time T3 of server WS3 and the user ID as the arguments (steps 703, 704). Thereby, vector table controlling part 50 registers the controlled time T2 in the vector table 51 of server WS1a. At this time, the counter value of the index counter in the vector table 51 is equal to two to indicate the next extry point in the vector table. The server WS1 possesses the ID of the vector table 51. This ID may be the same as the user ID of the end user.

After the controlled times for the HTTP sessions of server WS1 with servers WS2 and WS3 are registered in the server WS1a, the server WS1 calls an airplane reservation service of server WS2 with the user ID of the end user and the parameters of airplane reservation as the arguments. Also, server WS1 calls a rent-a-car reservation service of server WS3 with the user ID of the end user and the parameters of rent-a-car reservation as the arguments (steps 704, 705). Thereafter, if the server WS1 accepts temporary reservation responses from the servers WS2 and WS3, the temporary reservations are presented to the end user on the client computer display (step 706). If the user accepts the reservations, the server WS1 notifies servers WS2 and WS3 of the reservation settlement (step 707), and the necessary post-processing is performed (step 708).

As shown in FIG. 8, server WS1a registers the controlled times T2 and T3 in the vector table 51 (S801). Then, upon request from server WS2, server WS1a returns the controlled time T2 for server WS2 (S802). Then, upon request from server WS3, server WS1a returns the controlled time T3 for server WS3 (S803). FIG. 9 illustrates the configuration of the vector table 51 created during step 801. The vector table controlling part 50 registers the user ID "ID1" and controlled time T1 and then the controlled times T2 and T3 in the vector table 51. Then, the server WS1a accepts a request from the server WS2 with the user ID as the argument, and returns the controlled time T2 registered first in the vector table 51 to the server WS2 (step 802). (Server WS2 obtained the userID from the request made by server WS1.) At this point of time, the counter value of the index counter in the vector table 51 is changed from one to two to indicate the next entry. Also, upon accepting a request from the server WS3 with the user ID as the argument, the server WS1a returns the controlled time T3 registered second in the vector table 51 to the server WS3 (step 803). (Server WS3 obtained the userID from the request made by server WS1.) At this time, the counter value of the index counter in the vector table 51 is changed from two to three to indicate the next entry.

Upon accepting a request from the server WS1, the server WS2 creates an HTTP session for airplane reservation (step 1001), as shown in FIG. 10. Also, WS2 calls a sessionCreated( ) method within the listener class (sessionTimeSetListener) mounting the HttpSessionListener class (step 1002). The WS2 calls the sessionCreated( ) method only once when the HTTP session is created. Using this method, the server WS2 calls the getGlobalSessionTime( ) method for the server WS1a with the ID of the vector table 51 as the argument and obtains the controlled time T2 (step 1003). WS2 passes this controlled time T2 as the argument of the setMaxInactiveInterval( ) method in the HTTP session, and sets the session timeout for the HTTP session (step 1004). Because the URL of the server WS1a can be obtained from the WEB deployment descriptor (Context-Param) of the server WS2, for example, it is not required to change the program in the add-on class even when the URL of the server WS1a is changed. Thereafter, the server WS1 performs the processing for the HTTP session, and saves the information of temporary reservation in the airplane reservation (step 1005). If WS2 receives a notice of reservation settlement from the server WS1, the airplane reservation is settled with the contents of the temporary reservation (step 1006).

Similarly, upon accepting a request from the server WS1, the server WS3 creates an HTTP session for rent-a-car reservation (step 1001). The server WS3 calls the sessionCreated( ) method within the listener class (sessionTimeSetListener) mounting the HttpSessionListener class (step 1002). Using the sessionCreated( ) method, the server WS3 calls the getGlobalSessionTime( ) method for the server WS1a with the ID of the vector table 51 as the argument and obtains the controlled time T3 (step 1003). Then, the server WS3 passes this controlled time T3 as the argument of the setMaxInactiveInterval( ) method in the HTTP session, and sets the session timeout for the HTTP session (step 1004). Thereafter, the server WS1 performs the processing for the HTTP session, and server WS3 saves the information of temporary reservation in the rent-a-car reservation (step 1005). If a notice of reservation settlement is received from the server WS1, the rent-a-car reservation is settled with the contents of temporary reservation (step 1006).

Based on the foregoing, a system, method and program for coordinating time-outs for related sessions has been disclosed. However, numerous modifications and substitutions can be made without deviating from the scope of the present invention. For example, separate controlled times can be calculated for different applications/services within a single called server based on the expected processing time of the service. Therefore, the present invention has been disclosed by way of illustration and not limitation, and reference should be made to the following claims to determine the scope of the present invention.

The invention claimed is:

1. A method for determining time-outs for sessions between first and second servers and between first and third servers, said method comprising the steps of:

said first server receiving a client request for a first service, said first service requiring a second service from said second server and a third service from said third server; and said first server determining a first timeout for a first session between said first server and said second server to obtain said second service, and said first server determining a second timeout for a second session between said first server and said third server to obtain said third service, said first and second time-outs being based in part on an order in which said second and third servers begin their respective services.

2. A method as set forth in claim 1 further comprising the steps of:

said first server requesting said second service from said second server, and if said second server does not complete said second service before said first timeout, terminating said first session; and said first server requesting said third service from said third server, and if said third server does not complete said third service before said second timeout, terminating said second session.

3. A method as set forth in claim 1 wherein said second server begins said second service before said third server begins said third service, said first timeout is based on a time required for said second server to provide said second service and said third server to provide said third service, and said second timeout is based on a time required for said third server to provide said third service.

4. A method as set forth in claim 3 wherein said second timeout does not begin until said third server begins said third service.

5. A method as set forth in claim 1 wherein said first timeout is sufficient to allow said third server to provide said third service to said first server and allow said second server to provide said second service to said first server; and said second timeout is sufficient to allow said second server to provide said second service to said first server and allow said third server to provide said third service to said first server.

6. A method as set forth in claim 1 wherein said second service comprises a first sub service and a second sub service, said third service comprises a third sub service and a fourth sub service, said sub services are performed in an order of said first sub service, said third sub service, said second sub service and said fourth sub service; and said first timeout is based on a time for said first, third, second and fourth sub services, and said second timeout is based on a time for said third, second and fourth sub services, said second timeout being shorter than said first timeout.

7. A method as set forth in claim 6 wherein, said time for said first, third, second and fourth sub services comprises a time for said second server to perform said first and second sub services and associated communication time between said first and second servers and a time for said third server to perform said third and fourth sub services and associated communication time between said first and third servers; and said time for said third, second and fourth sub services comprises a time for said second server to perform said second sub service and associated communication time between said first and second servers and a time for said third server to perform said third and fourth sub services and associated communication time between said first and third servers.

8. A method as set forth in claim 7 further comprising the steps of said first server creating a session with said client and creating a third timeout for said session with said client, ending times for said first and second time-outs being based on an ending time for said third timeout.

9. A method as set forth in claim 1 wherein said second service comprises a first sub service and a second sub service, said third service comprises a third sub service and a fourth sub service, said sub services are performed in an order of said first sub service, said third sub service, said second sub service and said fourth sub service; and said first timeout is based on a time for said first, third, second and fourth sub services, and said second timeout is based on a time for said third, second and fourth sub services, said second timeout being shorter than said first timeout.

10. A computer program product for determining time-outs for sessions between first and second servers and between first and third servers, said program product comprising:

a computer readable storage medium;

first program instructions, for execution within said first server, to receive a client request for a first service, said first service requiring a second service from said second server and a third service from said third server; and second program instructions, for execution within said first server, to determine a first timeout for a first session between said first server and said second server to obtain said second service, and determine a second timeout for a second session between said first server and said third server to obtain said third service, said first and second time-outs being based in part on an order in which said second and third servers begin their respective services; and wherein said first and second program instructions are recorded on said medium.

11. The computer program product of claim 10, wherein said second timeout is based on a time required for said third server to provide said third service, a duration of said second timeout being shorter than a duration of said first timeout.

12. A method for applying session time-outs, said method comprising the steps of:

a first server receiving a client request for a first service;

said first server establishing a first session with said client, said first service requiring a second service from a second server in a second session and a third service from a third server in a third session;

said first server specifying a first timeout for said first session;

said first server determining a second timeout, based in part on said first timeout, for said second session; and said first server determining a third timeout, based in part on said first timeout, for said third session; and wherein a duration of said second timeout is different than a duration of said third timeout.

13. A method as set forth in claim 12 wherein said second and third time-outs are based in part on an order in which said second and third servers begin their respective second and third services.

14. A method as set forth in claim 12 further comprising the steps of said first server notifying said second server to begin said second service, and said first server notifying said third server to begin said third service.

15. A method as set forth in claim 12 further comprising the steps of:

said first server requesting said second service from said second server, and if said second server does not complete said second service before said second timeout, terminating said second session; and said first server requesting said third service from said third server, and if said third server does not complete said third service before said third timeout, terminating said third session.

16. A method as set forth in claim 12 wherein said second server begins processing said second request before said third server begins processing said third request, said first timeout is based on a time required for said second server to provide said second service and said third server to provide said third service, and said second timeout is based on a time required for said third server to provide said third service.

17. A computer system for determining session time-outs, said system comprising:

a CPU, a computer readable storage media, and a computer readable memory;

first program instructions to receive a client request for a first service;

second program instructions to establish a first session with said client, said first service requiring a second service from a second server in a second session and a third service from a third server in a third session;

third program instructions to specify a first timeout for said first session;

fourth program instructions to determine a second timeout, based in part on said first timeout, for said second session; and fifth program instructions to determine a third timeout, based in part on said first timeout, for said third session; and wherein a duration of said second timeout is different than a duration of said third timeout and wherein said first, second, third, fourth, and fifth program instructions are stored on said computer readable media for execution by said CPU via said computer readable memory.

18. A method for determining time-outs for sessions between first and second servers and between first and third servers, said method comprising the steps of:

said first server receiving a client request for a first service, said first service requiring a second service from said second server and a third service from said third server; and said first server determining a first timeout for a first session between said first server and said second server to obtain said second service, and said first server determining a second timeout for a second session between said first server and said third server to obtain said third service; and wherein said second server begins said second service before said third server begins said third service, said first timeout is based on a time required for said second server to provide said second service and said third server to provide said third service, and said second timeout is based on a time required for said third server to provide said third service, a duration of said second timeout being shorter than a duration of said first timeout.

19. The computer system of claim 17, wherein said third program instructions determine said first timeout between said first server and said second server to obtain said second service from said second server;

said fourth program instructions determine said second timeout for said second session between said first server and said third server to obtain said third service;

said second server begins said second service before said third server begins said third service, said first timeout is based on a time required for said second server to provide said second service and said third server to provide said third service, and said second timeout is based on a time required for said third server to provide said third service, a duration of said second timeout being shorter than a duration of said first timeout.

* * * * *

UNITED STATES PATENT AND TRADEMARK OFFICE
CERTIFICATE OF CORRECTION

PATENT NO. : 7,610,388 B2  Page 1 of 1
APPLICATION NO. : 10/805428
DATED : October 27, 2009
INVENTOR(S) : Hiroshi Yamamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1487 days.

Signed and Sealed this

Twelfth Day of October, 2010

David J. Kappos
*Director of the United States Patent and Trademark Office*